May 16, 1933. M. F. JAMAR, JR 1,909,277
WOUND SPOOL
Filed March 30, 1931
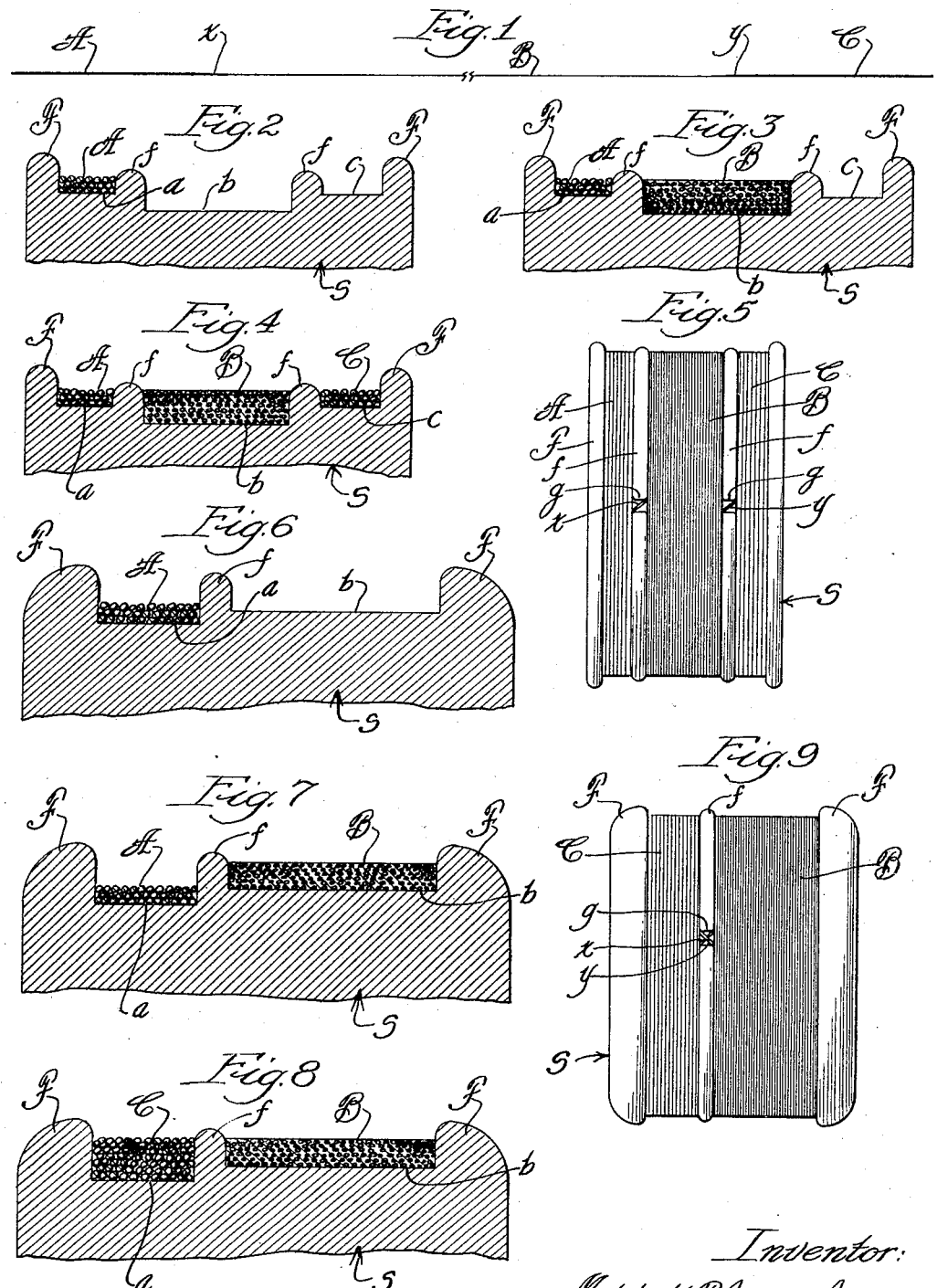

Patented May 16, 1933

1,909,277

UNITED STATES PATENT OFFICE

MITCHELL F. JAMAR, JR., OF DOWAGIAC, MICHIGAN, ASSIGNOR TO JAMES HEDDON'S SONS, OF DOWAGIAC, MICHIGAN, A CORPORATION OF MICHIGAN

WOUND SPOOL

Application filed March 30, 1931. Serial No. 526,291.

This invention is concerned with a spool which is adapted to receive the windings of a line the diameter of which is slightly enlarged in its end regions, and more particularly has to do with a spool construction by which the windings of such a line will be displayed with its portions of unequal diameter separated and/or with the outside windings of such a line disposed in a substantially common plane.

A line of the kind in contemplation may advantageously be used in the casting of artificial baits for fishing. It is supplied ordinarily in standard lengths, say, of fifty yards. The end portions of the line extending through perhaps ten feet are of slightly enlarged diameter as compared with the line body elsewhere. Those portions of the line intermediate the body of lesser diameter and the ends of greater diameter are tapered gradually through a distance of perhaps two or three feet. A line answering to this description is described at length in the pending application of Charles Heddon, filed January 12, 1931, Serial No. 508,040, now Patent No. 1,842,169, January 19, 1932.

It is customary to supply fishing lines wound upon a spool. No difficulties are presented with the ordinary line which is of uniform diameter from end to end. With the special line under discussion, however, certain problems arise due to unequal diameters in different portions of the line which produce uneven windings thereof when arranged upon a spool. Because of this circumstance, and because of the fact that it is desirable to exhibit separately in a neat and attractive manner the two line portions of such unequal diameter, the ordinary spool as heretofore known and used will not answer. It is accordingly with the end in view of providing for a display of the two portions of such a line in separated zones, and, optionally, to arrange the outer windings of the line to lie in a substantially common plane that the present spool has been evolved.

In the accompanying drawing is shown certain exemplifications of my invention in the manner following:

Figure 1 represents diagrammatically a fishing line of enlarged diameter in its two end regions, the intermediate or body portion thereof being shown only in part;

Fig. 2 is a fragmentary radial section through a spool upon which is wound one end of the line shown in Fig. 1;

Fig. 3 is a similar view showing the line further wound upon the spool to present the body of the line disposed in a zone separate from that containing the windings of enlarged diameter;

Fig. 4 shows the windings completed upon the spool, the end of the line last to be wound thereupon appearing in a zone separate from the other two;

Fig. 5 is a view in elevation of the wound spool;

Fig. 6 which is a view similar to Fig. 2 shows a spool of modified construction;

Fig. 7 shows the same spool with the windings continued thereon to accommodate the body portion of the line;

Fig. 8 shows the same spool with the windings completed to present the line end last wound in overlying relation to the line end windings first applied to the spool; and Fig. 9 is a view in elevation of the spool shown in Figs. 6, 7 and 8.

The line shown in Figs. 1, 2 and 3 comprises three principal portions A, B and C. The portions A and C in the regions of the line ends have a diameter slightly greater than that of the intermediate body portion B. Connecting the end portions with the intermediate body portion are relatively short tapering sections $x$ and $y$. The length of the end portions may be perhaps ten feet each, that of the connecting portions a yard or less in each instance, while the balance of the line, constituting its body portion, is ordinarily of maximum length. A spool which is adapted to accommodate such a line with windings of one or both end portions separated from the windings of the remaining portion may, if cylindrical, take some such form as is shown in elevation in Figs. 5 and 9, or be otherwise formed, as elliptical, polygonal, flat, etc.

Referring first to the construction illustrated in Figs. 2 to 5, inclusive, I have shown a spool S of the conventional cylindrical form having adjacent its two ends outside flanges F with other flanges $f$ arranged to the inside thereof. In this manner I provide three channels $a$, $b$ and $c$. These several flanges and channels may be continuous or otherwise. The depth of the channels is preferably determined with relation both to the width and length of the line portions to be accommodated therewithin. By providing for each channel a capacity which will properly accommodate the line portions for which it is designed, the topmost windings will arrange themselves in a substantially common plane as indicated clearly in Figs. 4 and 5.

In arranging the line windings upon a spool so formed, one end A of the line is first wound in the channel $a$. At about its tapering portion $x$, the line crosses into the adjacent channel $b$, and it may be found desirable to provide in the flange $f$ a gap $g$ for this purpose. The portion of the line which is then wound in this channel is the main body of slightly less diameter than the end portion received in the channel $a$. When the body portion is completely accommodated in the form of windings in the channel $b$, the line crosses the remaining flange $f$, through a second gap $g$, if desired, at about its tapering portion $y$, into the remaining channel $c$. The balance of the line representing the end portion B of enlarged diameter is then wound in this last channel. As above suggested, by determining the width and depth of each channel with relation to the diameter and length of the line portions to be accommodated therewithin, it is possible to build up a series of windings in each which will approach a common level. The inner and outer flanges F and $f$ define channels within which are separately confined the enlarged ends of the line and body portion thereof which is of slightly smaller diameter, the result being that these portions are arranged in windings which are individually displayed so as to indicate plainly the nature of the line which is accommodated on the spool.

Another construction in which provision is made for accommodating separately the windings of the two end portions of the line and those of the intermediate body portion is shown in Figs. 6 to 9, inclusive. Here the spool S is provided with flanges F adjacent its two ends and a single intermediate flange $f$ defining with the outside flanges two adjacent channels $a$ and $b$, the flanges and channels being continuous or otherwise. The depth and width of each channel is preferably determined with relation to the diameter and length of the line windings to be accommodated therein. In this case, however, it is contemplated that both end portions of the line shall be arranged in windings that are accommodated within the same channel $a$, the remaining or body portion of the line being wound in the adjacent channel $b$. In accomplishing this result one end portion of the line is first wound in the channel $a$, then the tapering connecting portion $x$ is led, as through a gap $g$ in the flange $f$, over to continue the windings of its body portion B in the channel $b$ after which the other tapering portion $y$ of the line is crossed back, as through the gap $g$, to present the remaining line end portion C in the channel $a$ where the windings are continued to completion over the first windings constituting the end portion A of the line. In this case, as in the construction first described, the level of the windings in both channels may be substantially the same, although this is an optional feature. The main object, however, of presenting separately the windings of an enlarged end of the line and those of its smaller body portions are realized satisfactorily in this construction.

The advantages of the present spool having line windings thereon as described, should be apparent. Not only is the line maintained in a proper and safe condition up to the time of its sale and use, but its peculiar characteristics are presented clearly to view through having its portions of unequal diameter separated for convenient display. It is possible, as shown herein, to so proportion the spool channels that the outside windings of the line will present a smooth appearance from end to end of the spool, thereby facilitating, if desired, the application of a band or ribbon around the line in accordance with a practice which is common with some manufacturers.

I claim:

1. A wound spool having a core so proportioned between its ends as to separately accommodate and display windings of line portions of unequal diameter in adjacent comparative relationship and in substantially a common plane.

2. A wound spool having adjacent stepped channels accommodating separately windings of line portions of unequal diameters, said channels being so proportioned with respect to the diameter and length of the wound line portions that the outside windings of the line will lie in a substantially common plane for the purpose of comparison and display.

3. A display package for a continuous length of line having portions of unequal diameters, comprising a stepped core on which the line is wound, and adjacent stepped portions of the core being wound with and accommodating portions of the line of unequal diameters, said stepped portions being so proportioned that the outside windings of each portion will lie in a substantially common plane for the purpose of comparison and display.

MITCHELL F. JAMAR, Jr.